UNITED STATES PATENT OFFICE.

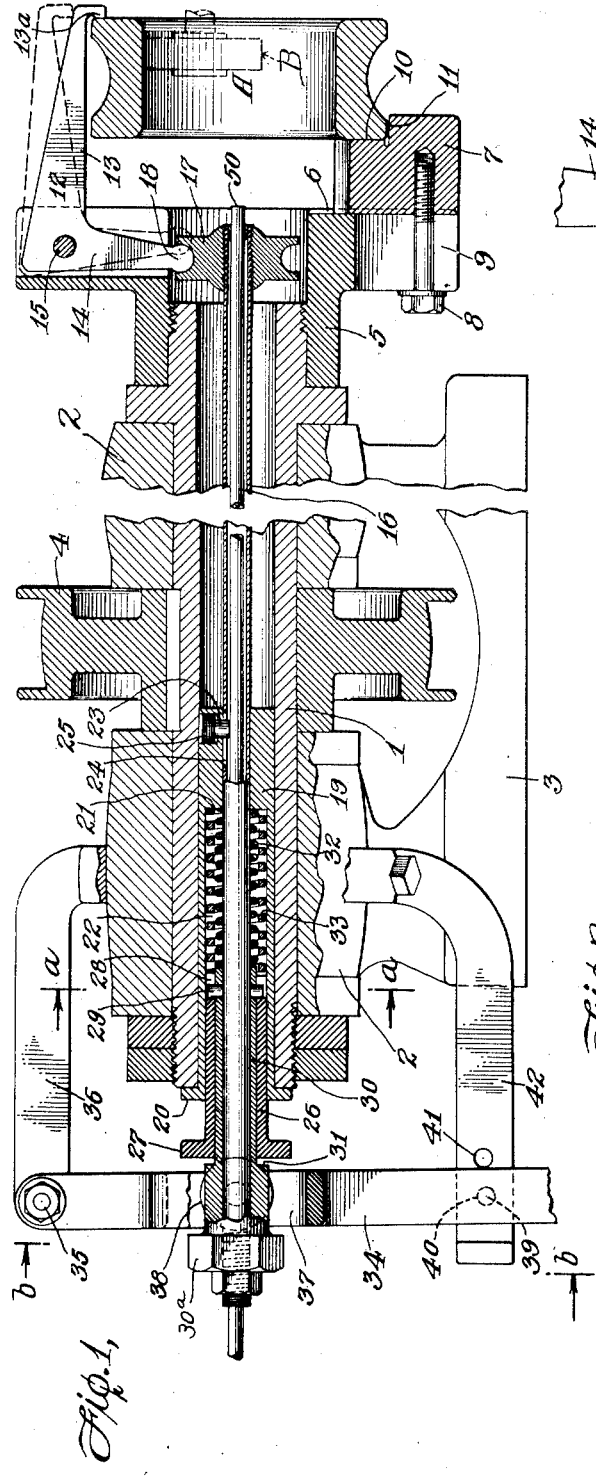
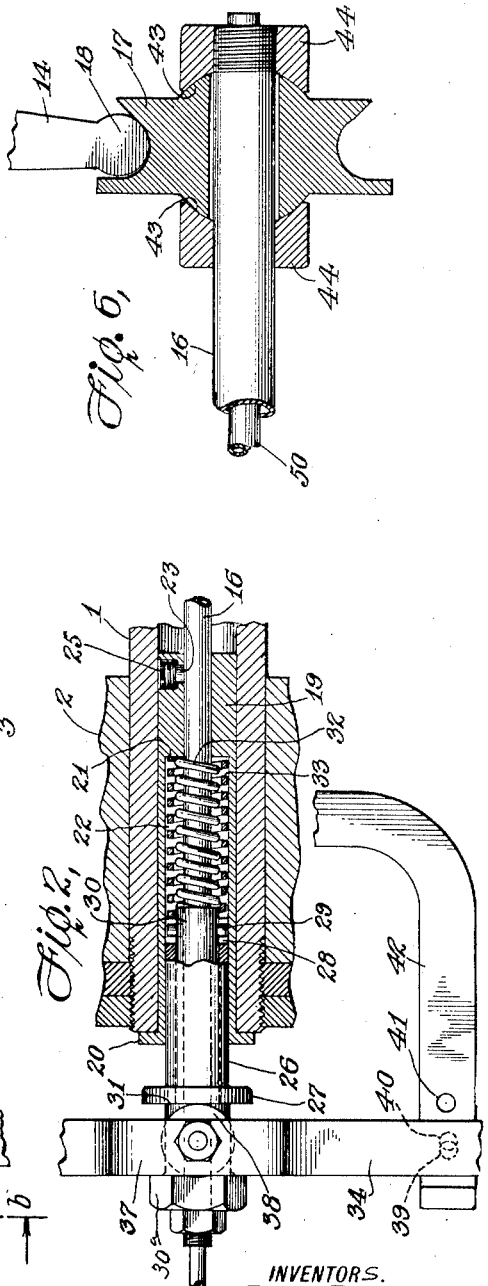

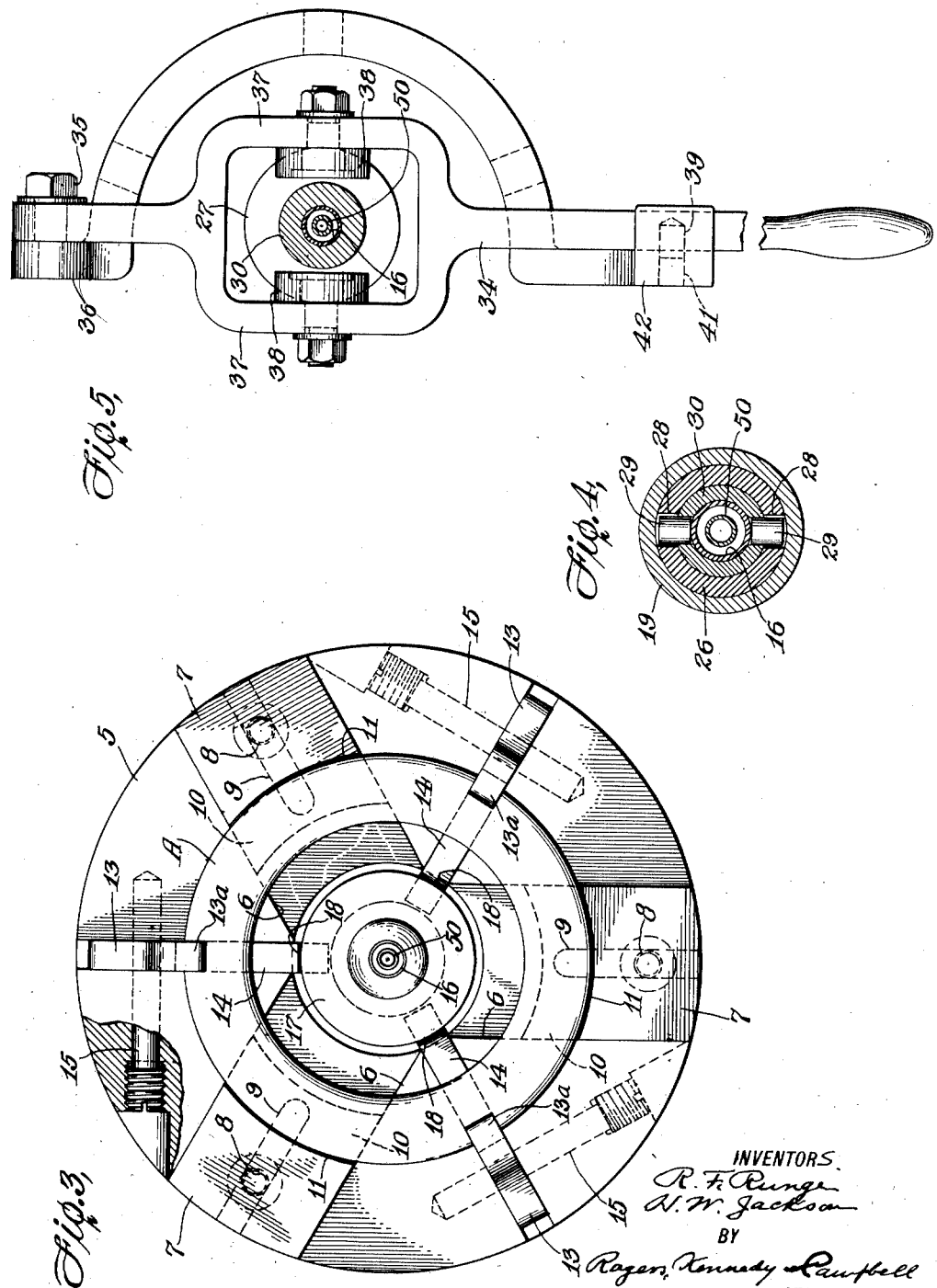

ROBERT F. RUNGE AND HENRY W. JACKSON, OF PHILADELPHIA, PENNSYLVANIA, ASSIGNORS TO THE HESS-BRIGHT MANUFACTURING COMPANY, A CORPORATION OF DELAWARE.

CHUCK.

1,390,961.  Specification of Letters Patent.  Patented Sept. 13, 1921.

Application filed July 27, 1917. Serial No. 183,029.

*To all whom it may concern:*

Be it known that we, ROBERT F. RUNGE and HENRY W. JACKSON, citizens of the United States, residing at Philadelphia, in the county of Philadelphia and State of Pennsylvania, have invented certain new and useful Improvements in Chucks, of which the following is a specification, reference being had therein to the accompanying drawing.

This invention relates to work-holding chucks designed more particularly for grinding or other light cutting or machining operations or annular ring-like work pieces, such for instance as the casing rings of antifriction bearings. In handling work of this type where the grinding or cutting operation is performed on the bore of the ring, the latter is held in the chuck and rotated about its longitudinal axis, and an operating tool is rotated about an axis parallel with the axis of the ring and is entered in the bore and operated thereon. It is important in this operation that the annular work piece be held by the chuck in true centered relation to the axis of rotation, and one of the objects of our invention is to provide for the centering of the work in the chuck automatically, expeditiously, and in a reliable manner by the engagement of the operating tool therewith.

Another object of our invention is to provide a chuck which is self-contained as to its operative parts, so that it may be applied to the machine as a complete structure and without the necessity of handling or assembling the parts separately.

With these and other objects in view our invention consists of the improved features of construction and arrangement of parts particularly described in the specification to follow.

In the accompanying drawings:

Figure 1 is a longitudinal sectional elevation of the chuck and operating parts with the latter in the position they occupy in gripping the work with a light pressure to permit the centering of the same.

Fig. 2 is a similar view with the parts in the position they occupy when the work is clamped by the jaws for the grinding operation.

Fig. 3 is a face view of the chuck with the work piece held thereby.

Fig. 4 is a transverse sectional elevation on the line *a—a* of Fig. 1.

Fig. 5 is a cross section on the line *b—b* of Fig. 1.

Fig. 6 is a sectional elevation of a modified form of connection between the pull rod and clamping jaws.

Referring to the drawings:

1 designates a chuck spindle of tubular form mounted for rotation in bearings 2 on a machine frame 3, which spindle may be rotated from any suitable source of power. In the present instance a driving pulley 4 is keyed to the spindle and receives its power from a suitable source. The spindle has fixed to its forward end a head 5 which is formed with a series of radial recesses 6 in which are mounted for radial adjustment, jaws or blocks 7 fastened to the head by fastening bolts 8 extending through radial slots 9 in the head and screwed into the blocks, whereby the latter are held in firm and fixed relations to the head but may be adjusted toward and from the center to accommodate work pieces of different sizes. The fixed jaws or blocks 7, in the present instance three in number, are formed with work seats 10 against which the side of the annular work piece A seats, and adjacent said work seats the blocks are formed with arcuate shoulders 11 against which the peripheral inner edge of the work piece rests.

12 designates work clamping jaws, each formed with an axially extending clamping arm 13 having an inwardly extending clamping finger 13ª, and a radially extending actuating arm 14, the said jaws being pivoted in radial slots in the head by means of pivot pins 15 sustained by the face plate and extending through the clamping jaws at the junction of the two arms, whereby the several jaws may be rocked on their pivots and the clamping fingers caused to swing inwardly toward the head to clamp the work, or to swing outwardly to release the work.

16 designates a pull rod for actuating the jaws, which rod extends longitudinally through the spindle and projects beyond the opposite ends of the same. At its forward end the rod has screwed thereon, a collar or spool 17 containing a peripheral groove in which spherical heads 18 on the inner ends of the jaw arms 14 loosely engage, so that when the spool is moved axially by the longitudinal movement of the pull rod in the manner to be presently described, the jaws will be swung on their pivots and will clamp or release the work, according to the direction of movement of the pull rod. Near its rear end the pull rod is surrounded by a sleeve 19 which is seated within the rear end of the spindle so as to be rotated therewith, the said sleeve being provided on its rear end with an annular shoulder 20 abutting against the end of the spindle. The internal diameter of the forward end of this sleeve is of a size to closely embrace the pull rod, and rearward of this point the sleeve is cored out or enlarged in diameter, thereby forming an inwardly extending annular shoulder 21 and an annular space 22 surrounding the pull rod, the purpose of which construction will presently appear. The sleeve 19 is formed at its forward end with a radial hole in which is seated a pin 23, the inner end of which engages in a longitudinal slot 24 in the pull rod, the pin being held engaged in the slot by a screw plug 25 screwed in the outer end of the opening and bearing on the pin. By this means the sleeve 19 in its rotation with the spindle, will cause the pull rod to be rotated with it, while admitting of a longitudinal movement of the pull rod relative to the sleeve for actuating the clamping jaws.

Sliding in the outer end of the sleeve 19 is a second sleeve 26 which projects some distance at its rear end beyond the end of the sleeve 19 and is provided with an outwardly extending annular shoulder 27. The inner end of the sleeve 26 is formed at diametrically opposite sides with open longitudinal slots 28 in which loosely extend radial pins 29 on a hollow plunger 30 which fits slidingly within the sleeve 26 and surrounds the rear portion of the pull tube. The plunger extends beyond the rear end of the sleeve 26, at which point it is formed with an annular outwardly extending shoulder 31 adapted to abut against the shoulder 27 on sleeve 26, and the plunger is provided with internal threads screwed on the threaded rear end of the pull rod, so that when the plunger is shifted longitudinally in the manner presently to be described, it will impart a corresponding shifting movement to the pull rod and thereby actuate the clamping jaws.

Surrounding the pull rod in the space 22 is a relatively light or weak spiral spring 32, the forward end of which bears against the annular shoulder 21 on the sleeve 19, while its rear end bears against the forward end of the plunger, the function of this spring being to urge the plunger rearwardly with a light pressure and thereby cause the clamping jaws to grip the work with a corresponding pressure to enable the work to be centered. Surrounding the spring 32 in the space 22, is a relatively stronger spiral spring 33, the forward end of which bears against the said shoulder 21, while its rear end bears against the forward end of the sleeve 26, the function of this spring being to apply to the plunger a relatively greater pressure and thereby cause the clamping jaws to clamp the work with a corresponding force for the grinding operation.

The clutch jaws are operated to respectively release, grip, and clamp the work, by the relative movements of the sleeve 26 and the plunger 30 in coöperation with the two springs, the weaker spring 32 acting through the plunger to apply a gripping pressure to the jaws, and the stronger spring acting through the sleeve 26 and plunger in applying a clamping pressure to the jaws. To effect the movement of the sleeve and plunger for these operations, we employ in the present instance, an operating lever 34 as shown more particularly in Figs. 1, 2 and 5, which lever is pivoted at one end as at 35, to the rear end of an arm 36 extending longitudinally of the spindle and fixedly connected with the machine frame. The lever is formed with two parallel spaced arms 37 which extend on opposite sides of the projecting end of the plunger in rear of the sleeve 26, the said arms having journaled on their inner sides, oppositely disposed rollers 38 in such position that they will engage the annular shoulder 27 on the sleeve 26. Near its end the lever is formed with a lock pin 39 which is adapted to be engaged in either of two holes 40 or 41 in the rear end of a horizontal arm 42 fixed at its forward end to the machine frame. When the lever is swung forwardly, the rollers thereon engaging the shoulder 27 on the sleeve 26, will thrust said sleeve forwardly and thereby compress the heavy spring 33 against the fixed shoulder 21, this action causing the rear walls of the slots 28 to approach the pins 29 on the plunger, and separating the shoulder 27 on the sleeve 26 from the shoulder 31 on the plunger. As the forward motion of the lever is continued, the walls of the slots 28 will engage the pins 29, and the plunger will be thrust forwardly with sleeve 26 and will compress the lighter spring 32 against the fixed shoulder 21. This forward movement of the plunger will, due to its connection with the pull rod, thrust the latter forwardly, and the chuck jaws will be swung outwardly to inoperative positions as shown by dotted lines in Fig. 1. By this time pin 39 on the lever has reached the hole 41 in the arm 42 and it may be engaged therein to hold the parts with the jaws open to permit the work to be set in place. The work ring A is now set in position on the work seat, and the operating lever disengaged from its forward locked position and moved back to a position where the pin 39 thereon may be entered in the hole 40. In this movement of the lever the pressure of the rollers on sleeve 26 is relieved, and the heavy spring 33 acting against the forward end of the sleeve 26, will shift said sleeve rearwardly and will cause it to follow the rollers, thereby separating the walls of the slots 28 from the pins. The light spring in this action also expands, and acting against the forward end of the plunger, the latter is moved back with yielding pressure and will correspondingly move the pull rod back and swing the clamping jaws inwardly in engagement with the work under a pressure controlled by the tension of the light spring. The work is now held under a light pressure so that it may be shifted radially on the work-seat to effect the centering of the same. This is effected by advancing the grinding wheel B axially within the bore of the work and then feeding the same transversely so as to engage and rotate in contact with the bore. If the work is not held in centered relation by the jaws, the bore will contact with the grinding wheel periodically as the work is rotated by the chuck, and by feeding the wheel laterally, the work will be shifted on its seat until the contact between the wheel and work is continuous and uninterrupted, this condition indicating that the work is in centered relation to the axis of rotation of the chuck. Having brought about this condition, the hand lever is disengaged from its locked position, whereupon the heavy spring 33 will thrust the sleeve 26 farther rearwardly, causing the shoulder 27 thereon to engage the shoulder 31 on the plunger, with the result that the plunger will be moved rearwardly with the sleeve under the influence of the heavy spring and will impart a corresponding movement to the pull rod and cause the clamping jaws to clamp the work piece to its seat under a pressure corresponding to the tension of the heavy spring. The work piece is now held so that the grinding tool may operate thereon to perform the grinding operation.

The pull rod is shown in the accompanying drawings as hollow in form, forming in effect a tube. It will be understood, however, that this tubular form is not necessary, and the rod may be solid throughout. By forming it tubular, provision is made for running a pipe 50 through it, where in the use of the chuck it might be desirable to subject the work to a stream of water or some cutting or polishing solution.

The lighter spring 32 may be adjusted as to its tension by screwing the plunger 30 inwardly or outwardly on the pull rod, the pin 23 engaging in the slot in the pull rod and preventing the latter from turning circumferentially in this operation. To enable the plunger to be thus adjusted for varying the tension of the spring, the rear projecting end of the plunger is formed with an angular head 30ª to receive a turning wrench or other suitable tool.

From the foregoing description it will be observed that the work piece is automatically centered by the engagement therewith of the rotating grinding wheel, this automatic centering being permitted by reason of the fact that the work piece is first gripped on the work seat with a light pressure, which will allow such radial movement of the work piece by the lateral feed of the grinding wheel as will be necessary to effect the centering of the same, and will not offer sufficient resistance to the feed of the tool to subject the same to undue strains; and after the centering is effected the jaws act with a heavier clamping pressure and clamp the work piece in its final centered position ready for the grinding or other operation.

Instead of connecting the spool 17 fixedly with the pull rod as by the screw threaded connection shown, the spool may be mounted on the rod in such manner as to be capable of a limited motion or play relative thereto in order to equalize the action on the clamping jaws in the event that the pull rod is not in true alinement with the axis of the chuck. This connection may be of the form shown in Fig. 6, where it will be seen that the hub of the spool is provided with spherical surfaces 43 which fit between opposing concaved clamping collars 44 applied to the pull rod, the diameter of the hub being slightly larger than the diameter of the tube in order to permit the spool to tip between the collars. This construction forms in effect a loose joint between the spool and pull rod and allows for equalizing the pressure on the clamping jaws in the action of the pull rod thereon.

The device as a whole is self contained, all of the parts being carried by the spindle 1, so that the chuck may be applied to existing machines with little or no change in the parts.

While in the foregoing description and accompanying drawings we have set forth our invention in the particular detailed form which we prefer to adopt, it will be manifest to one skilled in the art that the details thereof may be variously changed and modified without departing from the limits of our invention, and further it will be understood that the invention is not limited to any particular form or construction of the parts except in so far as such limitations are specified in the claims.

Having thus described our invention, what we claim is:

1. The combination of means for supporting the work, a movable member adapted to engage the work and hold it on the supporting means, releasable actuating means operable to move said member in a direction to release the work, and two springs arranged relatively to said actuating means to be placed under tension in succession when said actuating means is operated to release the work; whereby when said actuating means is released, the two springs in expanding will act on the movable member in succession and engage it with the work, first with a relatively light spring pressure, and then with greater spring pressure.

2. In a chuck, the combination of a head, a work holding jaw movably mounted on the head and adapted to engage and hold the work, releasable means operable to move the jaw in a direction to release the work, and two springs arranged relatively to said means to be placed under tension in succession when said means is operated to release the work; whereby when said means is released, the two springs in expanding will act on the work holding jaw in succession and engage it with the work, first with a relatively light spring pressure, and then with greater spring pressure.

3. In a chuck, the combination of a head, work holding jaws mounted thereon to engage and hold the work, releasable actuating means operable to move the jaws in a direction to release the work, two springs arranged relatively to the actuating means to be placed under tension one after the other when said means is operated to release the work, whereby when the actuating means is released, the springs in expanding will act on the jaws in succession and engage them with the work, first with a relatively light spring pressure, and then with greater spring pressure, and means for releasably holding the actuating means in position with one spring active on the jaws and with the other spring inactive on the jaws.

4. In a chuck, the combination of a head, work holding jaws to clamp the work thereon, a pull rod operatively connected with the jaws for operating the same, two springs acting on the pull rod to apply thereto respectively different degrees of pressure in the operation of the jaws, and means for controlling in succession the operation of said springs on the pull rod.

5. In a chuck, the combination of a chuck spindle, a head carried thereby, work holding jaws to clamp the work on the head, a pull rod operatively connected with the jaws for operating the same, a slidable sleeve surrounding the pull rod within the spindle, a spring surrounding the pull rod and acting respectively on the sleeve and spindle, a plunger surrounding the pull rod within the sleeve and adapted to be engaged by the sleeve, said plunger being connected with the pull rod, a second spiral spring surrounding the pull rod and acting against the plunger and spindle, and means for thrusting the sleeve longitudinally to compress the springs; whereby the springs in expanding will exert respectively different degrees of pressure on the pull rod.

6. In a chuck, the combination of a chuck spindle, a head carried thereby, work holding jaws to clamp the work on the head, an endwise movable pull rod operatively connected with the jaws for operating them, a spring acting between the spindle and pull rod and adapted to be compressed when the pull rod is moved endwise to open the jaws, and a second spring acting between the spindle and pull rod, and adapted to be compressed in said movement of the pull rod after the compression of the first spring; whereby on the release of the pull rod, the springs in expanding will move the pull rod in the opposite direction and will cause the jaws to clamp the work, first with a comparatively light spring pressure, and then with greater spring pressure.

7. In a chuck, the combination of a chuck spindle, a head carried thereby, work holding jaws to clamp the work on the head, an endwise movable pull rod operatively connected with the jaws for operating the same, a longitudinally slidable sleeve surrounding the pull rod within the spindle and adapted to engage the pull rod, a spiral spring surrounding the pull rod and acting respectively on the sleeve and spindle, a second spiral spring surrounding the pull rod and acting thereon and on the spindle, and means for moving the sleeve in one direction longitudinally to open the jaws and compress the springs; whereby the springs in expanding will move the pull rod in the opposite direction with successively different degrees of pressure.

8. In a chuck, the combination of a chuck spindle, a head carried thereby, work holding jaws to clamp the work on the head, an endwise movable pull rod operatively connected with the jaws for closing them when the pull rod is moved rearwardly, a slidable sleeve surrounding the pull rod within the spindle and formed in its forward end with longitudinal open slots, said sleeve being movable longitudinally relatively to the pull rod, a spring acting against the sleeve and spindle and adapted to be compressed when the sleeve is moved forwardly, a plunger surrounding the pull rod within the sleeve and connected to the pull rod to move therewith, pins on the plunger engaging in the slots in the sleeve, a spring acting between the forward end of the plunger and the spindle and adapted to be compressed when the plunger is moved forwardly, and means for moving the sleeve forwardly to compress said spring; whereby the springs in expanding, will move the pull rod rearwardly and thereby close the jaws on the work with successively different degrees of pressure.

9. In a chuck, the combination of a rotary chuck spindle, a head carried thereby, work holding jaws to clamp the work on the head, a longitudinally movable pull rod extending within the spindle and operatively connected with the jaws for operating the same, a sleeve surrounding the pull rod within the spindle, said sleeve being movable longitudinally of the spindle into engagement with the pull rod to operate the same, and an operating lever in position to engage the sleeve and move the same longitudinally.

10. In a chuck, the combination of a rotary chuck spindle, a head carried thereby, two holding jaws to clamp the work on the head, a longitudinally movable pull rod extending within the spindle and operatively connected with the jaws for operating the same, a sleeve surrounding the pull rod within the spindle, said sleeve being movable longitudinally of the spindle into engagement with the pull rod to operate the same, an operating lever, and rollers on said operating lever in position to engage the sleeve on opposite sides and move the same longitudinally.

11. The combination of a rotary work support adapted to give direct support to the work and on which support the work may be shifted laterally for centering purposes, a movable holding member adapted to directly engage the work and hold it on the support, means acting on said holding member and operable to cause it to hold the work movably on the support with relatively light pressure, so that an operating tool may be brought into contact with the rotating work to shift it laterally on the work support and thereby center it, and additional means acting on said holding member and operable to cause it to hold the work more firmly in its centered position so that it may be operated on.

12. The combination of a rotary work support constructed to give direct support to the work and on which support the work may be shifted laterally for centering purposes, means adapted to act upon a work piece so supported to hold the same movably on the support with relatively light pressure so that an operating tool may be brought into contact with the rotating work piece to shift it laterally of the work support and thereby center it, and additional means adapted to produce increased pressure upon the work piece and hold the same more firmly in its centered position so that it may be operated upon by the tool.

In testimony whereof we have affixed our signatures hereto.

ROBERT F. RUNGE.
HENRY W. JACKSON.